United States Patent
Kurokami et al.

[11] Patent Number: 5,923,158
[45] Date of Patent: Jul. 13, 1999

[54] POWER CONTROL APPARATUS FOR SOLAR POWER GENERATION SYSTEM

[75] Inventors: Seiji Kurokami, Kyotanabe; Kimitoshi Fukae, Nara; Nobuyoshi Takehara, Soraku-gun, all of Japan

[73] Assignee: Canon Kabushiki Kaisha, Tokyo, Japan

[21] Appl. No.: 08/919,445

[22] Filed: Aug. 28, 1997

[30] Foreign Application Priority Data

Aug. 30, 1996 [JP] Japan .................................. 8-230236

[51] Int. Cl.$^6$ ............................. G05F 5/00; H02M 5/42
[52] U.S. Cl. ................................... 323/299; 363/79
[58] Field of Search .................................. 323/299, 303, 323/906; 363/78, 79

[56] References Cited

U.S. PATENT DOCUMENTS

| | | | |
|---|---|---|---|
| 4,649,334 | 3/1987 | Nakajima | 323/299 |
| 4,868,379 | 9/1989 | West | 250/203 R |
| 5,592,074 | 1/1997 | Takehara | 362/131 |
| 5,621,300 | 4/1997 | Sato et al. | 320/5 |
| 5,654,883 | 8/1997 | Takehara et al. | 363/79 |
| 5,682,305 | 10/1997 | Kurokami et al. | 323/299 |
| 5,714,869 | 2/1998 | Tamechika et al. | 320/30 |

*Primary Examiner*—Matthew Nguyen
*Attorney, Agent, or Firm*—Fitzpatrick, Cella, Harper & Scinto

[57] ABSTRACT

In a power control apparatus of a solar power generation system for converting power generated by a solar panel and supplying the converted power to a load, the output voltage and output current of the solar panel are sensed, and, under ordinary conditions, MPPT control is performed so that the solar cells will operate at a maximum output point. If the output power of the solar panel exceeds a predetermined power, a power conversion unit is controlled so as to raise the output voltage of the solar panel, thereby limiting the output power of the solar panel. As a result, excessive power is prevented from being output by the power control apparatus.

14 Claims, 7 Drawing Sheets

POWER CONTROL APPARATUS FOR SOLAR POWER GENERATION SYSTEM

BACKGROUND OF THE INVENTION

1. Field of the Invention

This invention relates to a power control apparatus for a solar power generation system.

2. Description of Related Art

A known solar power generation system comprises a solar cell array which converts sunlight to electrical energy and a power control apparatus which converts the power generated by the solar cell array to power in a state suited to the load and supplies the power to the load.

Since the power generated by a solar cell array fluctuates significantly depending upon the amount of solar radiation and the temperature as well as the operating-point voltage and current of the solar cells, the power control apparatus performs maximum power point tracking control (hereinafter "MPPT control") for adjusting the load of the solar cell array to extract the maximum power from the solar cell array at all times.

Since power Pmax at the maximum power point of a solar cell is approximately proportional to the amount of solar radiation, however, there is the danger that the power control apparatus will output excessive power when the solar radiation is intense. Known methods of preventing this include a method of providing an upper limit for the output value of the power control apparatus and limiting the output current of the power control apparatus to a predetermined value thereby to protect the components constituting the power control apparatus from excessive current, and a method of sensing the output power of the power control apparatus and controlling the output power in such a manner that it will not exceed a predetermined value.

However, these methods have an important drawback. Specifically, in a power control apparatus which limits the output current to a fixed value, there are occasions where the output voltage of the power control apparatus fluctuates and exceeds the rated voltage in a case where the output voltage is not dependent solely upon the power control apparatus, e.g., when a commercial AC power system has been connected as the load. As a consequence, there are instances where the output power of the power control apparatus surpasses the rated power even if the output current is limited.

When the output power of the power control apparatus becomes too large, more heat is produced within the apparatus, making it necessary to thermally protect the components constituting the power control apparatus.

SUMMARY OF THE INVENTION

Accordingly, an object of the present invention is to prevent excessive power from being output by a power control apparatus for a solar power generation system.

Another object of the present invention is to thermally protect the components constituting the power control apparatus by preventing the output of excessive power.

According to the present invention, the foregoing objects are attained by providing a power control apparatus for supplying a load with power output by a solar cell, comprising converting means for converting output power of the solar cell to power conforming to the load; sensing means for sensing output voltage and output current of the solar cell; setting means for setting operating voltage of the solar cell based upon the output voltage and output current sensed; and control means for controlling operation of the converting means in such a manner that the output voltage of the solar cell becomes a set operating voltage; wherein the setting means raises the operating voltage by a predetermined amount of voltage in a case where the product of the output voltage and output current sensed is greater than a predetermined value.

According to the present invention, the foregoing objects are attained by providing a power control apparatus for supplying a load with power output by a solar cell, comprising: converting means for converting output power of the solar cell to power conforming to the load; sensing means for sensing output voltage and output current of the solar cell; designating means for designating operating conditions of the solar cell based upon the output voltage and output current sensed; and control means for controlling operation of the converting means based upon a designation made by the designating means; wherein in a case where the product of the output voltage and output current sensed is equal to or less than a predetermined value, the designating means designates the operating voltage of the solar cell and the control means controls operation of the converting means in such a manner that the output voltage of the solar cell attains the operating voltage that has been designated; and in a case where the product of the output voltage and output current sensed exceeds the predetermined value, the designating means designates the operating voltage of the solar cell and instructs the control means to suppress power, and the control means controls the operation of the converting means in such a manner that the output voltage of the solar cell attains a control voltage obtained by adding a predetermined voltage to the operating voltage that has been designated.

According to the present invention, the foregoing objects are attained by providing a power control apparatus for supplying a load with power output by a solar cell, comprising: converting means for converting output power of the solar cell to power conforming to the load; first sensing means for sensing output power of the converting means; second sensing means for sensing output voltage and output current of the solar cell; setting means for setting operating voltage of the solar cell based upon the sensed output voltage and output current of the solar cell; and control means for controlling the output voltage of the solar cell by controlling operation of the converting means based upon the set operating voltage and sensed output power of the converting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of a power control apparatus according to the present invention will now be described in detail with reference to the drawings.

[First Embodiment]

Figure 1:
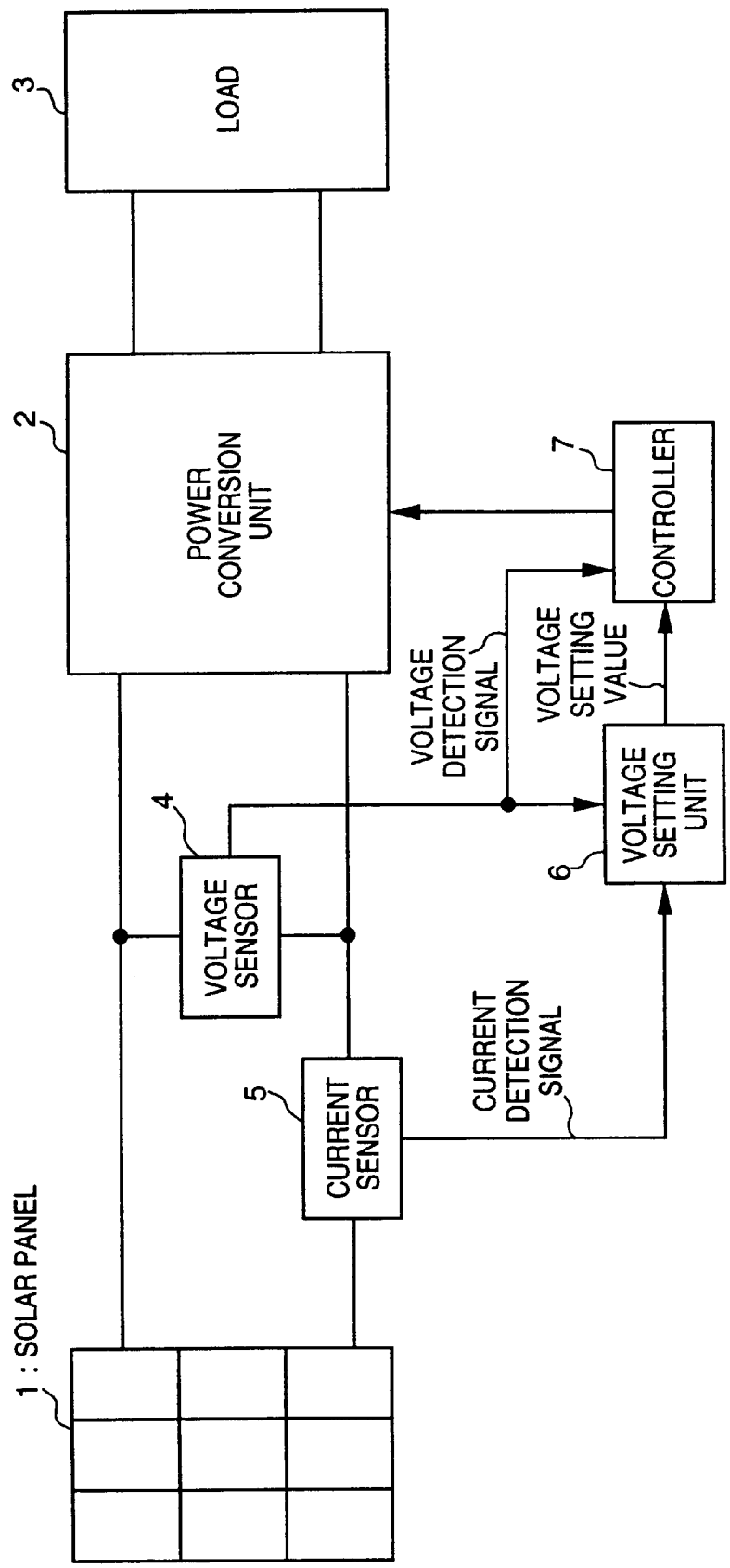
FIG. 1 is a block diagram illustrating the construction of a solar power generation system which uses a power control apparatus according to a first embodiment of the present invention.

FIG. 1 illustrates the construction of a solar power generation system which uses a power control apparatus according to the present invention.

As shown in FIG. 1, the system includes a solar panel 1 which generates electric power that is converted by a power conversion unit 2 to power in a state suited to a load 3. The power resulting from the conversion is supplied to the load 3.

The solar panel 1 may be obtained by combining, in a parallel/serial arrangement, a plurality of solar cells which employ amorphous silicon, crystalline silicon or a compound semiconductor, wherein the cells are arrayed so as to obtain the desired output voltage and current.

The power conversion unit 2 may be a DC/DC converter or voltage-fed self-exited inverter using self turn-off type switching devices such as power transistors, power MOSFETs, insulated gate bipolar transistors (IGBTs) or gate turn-off thyristors (GTOs). The output (power, voltage, frequency, etc.) of the power conversion unit 2 can be controlled by changing the on/off duty (referred to also as the "duty ratio" below) of the gate pulses supplied to the switching devices of the power conversion unit 2.

Examples of the load 3 are a load such as an electric heater or electric motor or a commercial AC power system. In a case where the load 3 is the commercial AC power system, i.e. in case of a grid connection solar power generation system, the power tied to the commercial AC power system is not limited, thus this arrangement is a highly desirable one for a case where a greater amount of power is to be extracted from the solar panel 1.

The output voltage and output current of the solar panel 1 are sampled by a voltage sensor 4 and current sensor 5. The voltage sensor 4 outputs, as digital data, a voltage signal which indicates the output voltage of the solar panel 1. The voltage signal enters a voltage setting unit 6 and a controller 7. The current sensor 5 outputs, as digital data, a current signal which indicates the output current of the solar panel 1. This signal enters the voltage setting unit 6.

The voltage setting unit 6 decides the value of a voltage setting based upon the voltage signal and current signal applied thereto. The voltage setting unit 6 can be implemented by a microcomputer for control and is constituted by a CPU, RAM, ROM, input/output unit, etc.

The controller 7 adjusts the above-mentioned duty ratio in such a manner that the output voltage of the solar panel 1 takes on the value of the voltage setting decided by the voltage setting unit 6, and generates PWM pulses based upon this duty ratio. The PWM pulses are the gate pulses for driving the gates of the switching devices in the power conversion unit 2. A feedback control system based upon proportional integration (PI) control can be mentioned as one method of adjusting duty ratio. Methods of generating the PWM pulses include the triangular wave comparison method and the hysteresis comparator method.

The controller 7 can be constituted by an analog circuit or digital circuit. In a case where the controller 7 is a digital circuit, the controller is composed of a CPU or DSP and can be implemented by a single microcomputer for control together with the voltage setting unit 6. Thus, the output of the power conversion unit 2 is controlled to control the output voltage of the solar panel 1.

The voltage setting method carried out by the voltage setting unit 6 will now be described in detail with reference to the flowchart of FIG. 2.

Initial settings are made at step S00. Specifically, the initial operating-point voltage is set to V0, step width for searching for voltage is set to dV, the direction of the voltage search is set to the decreasing direction, and a power limit value, which is a limit value on power that enters the power convention unit 2 from the solar panel 1, is set to PL.

This is followed by step S01, at which the initial operating-point voltage V0 is set to an operating voltage V to set the operating point of the solar panel 1 when the operation of the power control apparatus is started. The set operating voltage V is sent to the controller 7 as a voltage setting value.

Next, at step S02, the operating-point voltage and current of the solar panel 1 are sampled and the product of the obtained voltage and current is calculated to find the output power P0 of the solar panel 1. The value of P0 is stored in memory.

The output power P0 and power limit value PL are compared at step S03. If $P0 \leq PL$ holds, this is decided to be the normal state and the flow proceeds to step S04.

The voltage search processing is performed at step S04 based upon the voltage search direction initially set. If the set voltage search direction is the increasing direction, the operating voltage is set to a voltage V+dV, which is obtained by increasing V by the step width dV. If the set voltage search direction is the decreasing direction, the operating voltage is set to a voltage V−dV, which is obtained by decreasing V by the step width dV. The operating voltage V that has been set in dependence upon voltage search direction is sent to the controller 7 as the voltage setting value. The flow proceeds to step S07.

The present operating-point voltage and current of the solar panel 1 controled by the controller 7 based upon operating voltage V set at step S05 or step S06 are sampled at step S07, output power P1 is obtained from the product of the voltage and current in the manner set forth above, and the output power P1 is stored in memory.

Next, at step S08, the output power P1 of the present operating point of the solar panel 1 and the output power P0 of the preceding operating point are compared. If the output power is not increasing (i.e., if $P1 \leq P0$ holds), then the voltage search direction is reversed at step S09. That is, the direction is made the increasing direction if the present voltage search direction is the decreasing direction, and the direction is made the decreasing direction if the present voltage search direction is the increasing direction. The flow proceeds to step S10. If the output power is found to be increasing at step S08, then the flow proceeds to step S10 directly without the voltage search direction being changed.

The stored value of the output power P0 is updated to the value of the output power P1 at step S10, after which the flow is returned to step S03. Ordinarily the steps S03 to S10 are repeated so that the operating point of the solar panel 1 is controlled in such a manner that the maximum power is extracted from the solar panel 1. In other words, the voltage setting unit 6 sets the operating voltage V in such a manner that the maximum power point of the solar panel 1 is tracked.

In a case where solar radiation is very intense, there is a possibility that the output power P0 will exceed the power limit value PL when the output power P0 and power limit value PL are compared at step S03. In such case the flow of processing is from step S03 to step S11.

The voltage search direction is set to the increasing direction at step S11 regardless of the previously set voltage search direction. Since the voltage search direction is set to the increasing direction at step S11, the decision rendered at step S04 is such that the flow proceeds from step S04 to step S05, at which the operating voltage V is raised by the step width dV. Processing from steps S07 to S10 is then executed in the manner described above.

Figure 5:
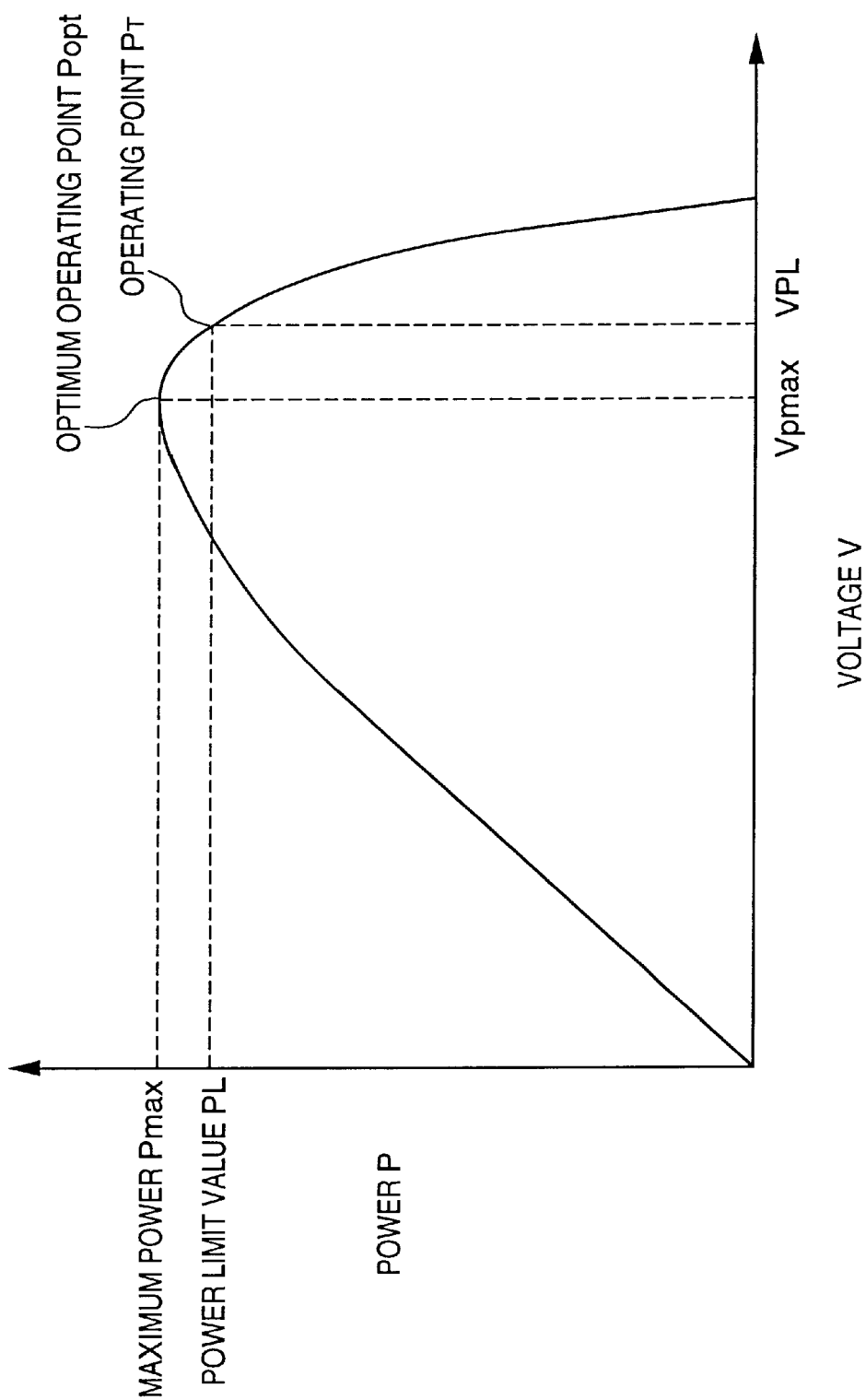
FIG. 5 is a graph showing the output characteristic of a solar panel under certain solar radiation conditions.

During the time that the output voltage P0 is greater than the power limit value PL (P0>PL), steps S03, S1, S04, . . . , S10 are repeated and the operating voltage V is raised at increments of the step width dV until the output power P0 becomes equal to or less than the power limit value PL (P0≦PL), i.e. in such a manner that the solar panel 1 will develop an operating-point voltage so as to obtain an output power P0 that is approximately equal to the power limit value PL. As a result, as indicated by the output characteristic curve of the solar panel 1 under certain solar radiation conditions shown in FIG. 5, the voltage setting unit 6 sets the operating voltage V so as to track the operating point PT of the solar panel 1 in the vicinity of the power limit value PL.

If the solar radiation weakens, the power generated by the solar panel 1 declines and the output power P0 falls below the power limit value PL, the voltage setting unit 6 sets the operating voltage V again so as to track the usual maximum power point. Conversely, if the solar radiation strengthens and the maximum power Pmax of the solar panel 1 surpasses the power limit value PL, the voltage setting unit 6 acts so as to suppress the output power of the solar panel 1 and sets the operating voltage V so as to track the operating point $P_T$.

Thus, in accordance with the first embodiment, the operating point of the solar panel 1 usually is controlled in such a manner that the maximum power Pmax is extracted from the solar panel 1, whereby more power is supplied to the load 3. In a situation where the output power of the solar panel 1 surpasses the power limit value PL, the operating-point voltage of the solar panel 1 is raised thereby to hold the output power of the solar panel 1 at the power limit value PL. In other words, the present invention focuses on the relationship between the input power and output power of the power control apparatus and controls the output power of the solar panel 1, which is equal to the input power of the power control apparatus, thereby exercising control in such a manner that the output power of the power control apparatus does not become excessively large.

As a result, it is possible to prevent the output power of the power control apparatus from becoming excessive through a simple arrangement without adding on hardware for sensing the output power of the power control apparatus. Consequently, the generation of heat within the apparatus is suppressed and the components that constitute the power control apparatus, particularly the power conversion unit 2, can be protected from heat produced by an excessive load.

In the embodiment described above, the so-called hill-climbing method of gradually raising or lowering the operating-point voltage is used as the method of extracting the maximum power Pmax from the solar panel 1. However, this does not impose a limitation upon the invention, for other methods, such as the curve approximation method disclosed in the specification of Japanese Patent Application Laid-Open No. 6-348352 may be used without departing from the gist of the present invention.

[Second Embodiment]

Figure 3:
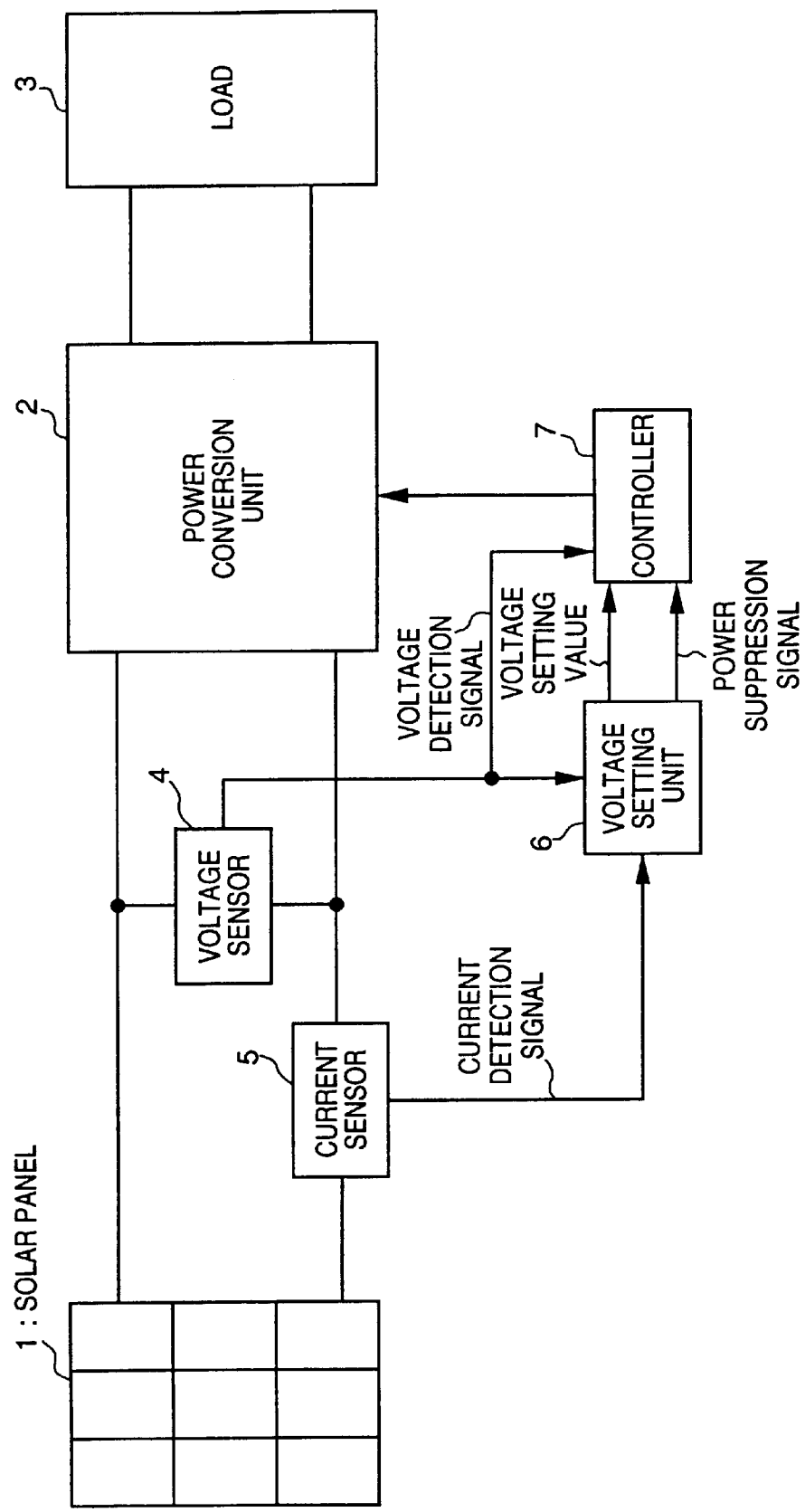
FIG. 3 is a block diagram illustrating the construction of a solar power generation system which uses a power control apparatus according to a second embodiment of the present invention.

FIG. 3 illustrates the construction of a solar power generation system which uses a power control apparatus according to a second embodiment of the present invention. This embodiment differs from that shown in FIG. 1 in that a power suppression signal is sent from the voltage setting unit 6 to the controller 7. The two arrangements are the same in other respects.

In the absence of the power suppression signal, the controller 7 adjusts the duty ratio of the gate pulses applied to the switching devices of the power conversion unit 2 in such a manner that the output voltage of the solar panel 1 takes on a voltage setting value specified by the voltage setting unit 6. This operation is similar to that of the first embodiment. When the power suppression signal is output from the voltage setting unit 6, the duty ratio is adjusted in such a manner that the output voltage of the solar panel 1 becomes greater than the voltage setting value. When the power suppression signal vanishes, the duty ratio is adjusted in such a manner that the output voltage of the solar panel 1 will approach the voltage setting value.

The method of setting the voltage in the second embodiment will be described in detail with reference to the flowchart shown in FIG. 4. It should be noted that steps identical with those of the voltage setting method of the first embodiment shown in FIG. 2 are designated by like step numbers and need not be described again in detail.

The output power P0 and power limit value PL are compared at step S03, as set forth earlier. There are instances where the output power P0 surpasses the power limit value PL, as when the solar radiation becomes very intense. In such case the flow of processing proceeds from step S03 to step S31.

The power suppression signal indicating suppression of power is output at step S31. In response, the controller 7 corrects the voltage setting value to a higher value based upon a preset operating characteristic curve of the solar panel 1 so as to lower the duty ratio of the gate pulses applied to the switching devices of the power conversion unit 2. In other words, the ON time of the gate pulses decreases and the OFF time increases. As a result, the power that enters the power conversion unit 2 declines.

Next, at step S32, the operating-point voltage and the current of the solar panel 1 are sampled, the output power P0 is obtained from the product of the voltage and current, as mentioned earlier, and P0 is stored in memory.

The output power P0 of the present operating point of the solar panel 1 and the power limit value PL are compared at step S33. If the output power P0 is still greater than the power limit value PL (P0>PL), the flow is returned to step S31. During the time that the output power P0 is greater than the power limit value PL (P0>PL), the loop from step S31 to step S33 is repeated so as to suppress the power that enters the power conversion unit 2.

If the output power P0 of the present operating point of the solar panel 1 is found to be equal to or less than the power limit value PL (P0≦PL) at step S33, it is decided that no further suppression of voltage is required and the flow of processing proceeds to step S34.

A power suppression signal indicating cancellation of power suppression is output at step S34. In response, the controller 7 reduces the amount of correction of the voltage setting value so as to increase the duty ratio of the gate pulses applied to the switching devices of the power conversion unit 2. In other words, the ON time of the gate pulses increases and the OFF time decreases. As a result, the power that enters the power conversion unit 2 increases.

This is followed by step S35, at which the operating-point voltage and the current of the solar panel 1 are sampled, the output power P0 is obtained from the product of the voltage and current, as mentioned earlier, and P0 is stored in memory. Then, at step S36, the sampled operating-point voltage Vop and operating voltage V are compared. If the operating-point voltage Vop is greater than the operating voltage V (V<Vop), then operation of the controller 7 is decided to still be in the power suppression state, and the flow is returned to step S33.

Thus, in a case where the output power P0 is equal to or less than the power limit value PL (P0≦PL) and the sampled operating voltage Vop is greater than the operating voltage V (V<Vop), the steps from S33 to S36 are repeated, the amount of correction of the voltage setting value of the controller 7 is made to approach zero, and the controller 7 is released from the power suppression state.

In a case where the output power P0 surpasses the power limit value PL during the process of releasing the controller 7 from the power suppression state by repeating the steps S33 to S36, the flow again returns to step S31, and the foregoing operation is performed.

If it is found at step S36 that the sampled operating voltage Vop has fallen below the set value V of operating voltage (V≧Vop), then it is decided that suppression of power is not required and that the controller 7 has been released from the power suppression state. The flow is then returned to step S23.

Thus, in accordance with the second embodiment, the operating point of the solar panel 1 usually is controlled in such a manner that the maximum power Pmax is extracted from the solar panel 1, whereby more power is supplied to the load 3. In a situation where the output power of the solar panel 1 surpasses the power limit value PL, the signal indicative of power suppression is sent to the controller 7. Upon receiving this signal, the controller 7 revises the voltage setting value V sent from the voltage setting unit 6 and performs control so as to raise the operating-point voltage of the solar panel 1, thereby holding the output power of the solar panel 1 at the power limit value PL.

As a result, it is possible to prevent the output power of the power control apparatus from becoming excessive through a simple arrangement without adding on hardware for sensing the output power of the power control apparatus. Consequently, the generation of heat within the apparatus is suppressed, and the components that constitute the power control apparatus, particularly the power conversion unit 2, can be protected from heat produced by an excessive load.

[Third Embodiment]

Figure 6:
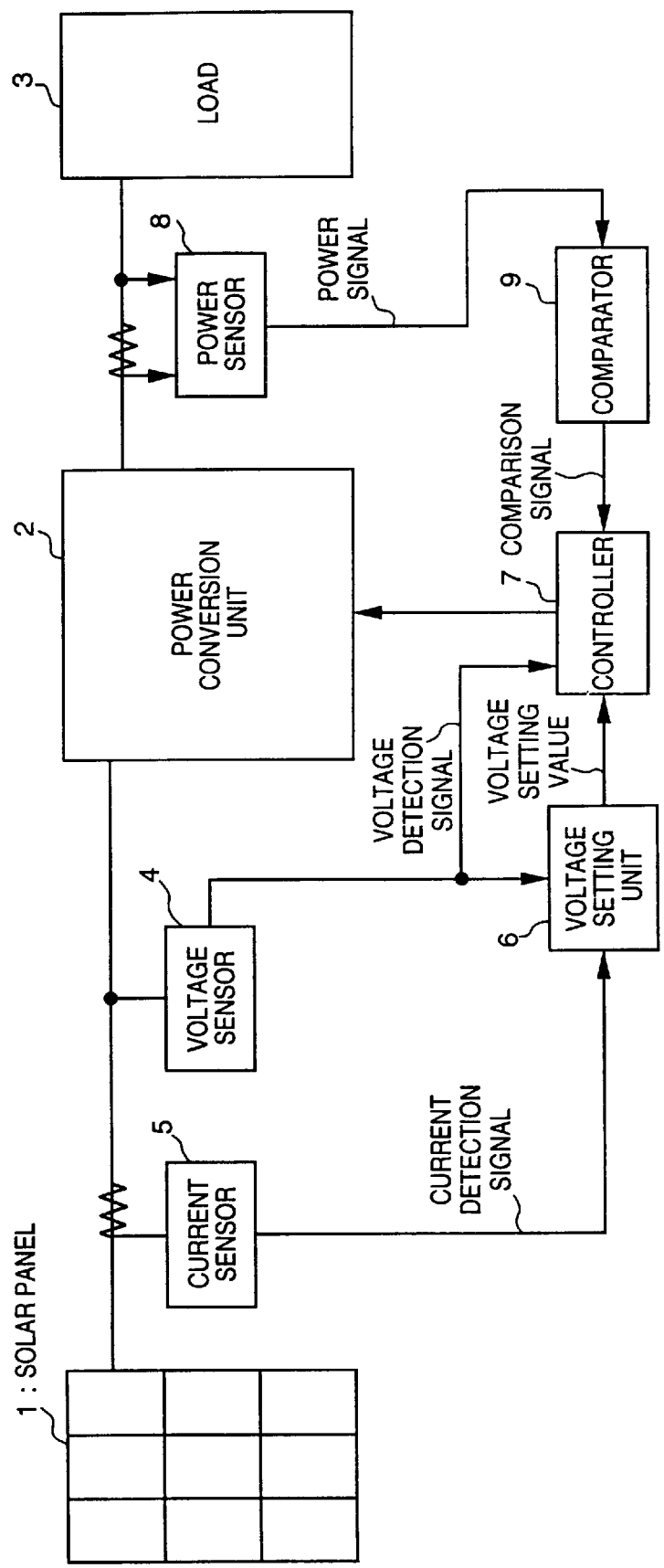
FIG. 6 is a block diagram illustrating the construction of a solar power generation system which uses a power control apparatus according to a third embodiment of the present invention.

FIG. 6 is a block diagram showing the construction of a third embodiment. This embodiment differs from that shown in FIG. 1 in the provision of a power sensing unit 8 and comparator 9. As mentioned above, the voltage setting unit 6 outputs a voltage setting value Vs set so as to obtain the maximum power point power Pmax from the solar panel 1 based upon the signals representing the sensed voltage and sensed current.

The power sensing unit 8 measures the output power Po of the power conversion unit 2 and outputs a power signal indicative of the measured output power Po to the comparator 9. The comparator 9 compares the power Po indicated by this power signal with a predetermined value Pd and outputs a comparison signal to the controller 7.

Figure 7:
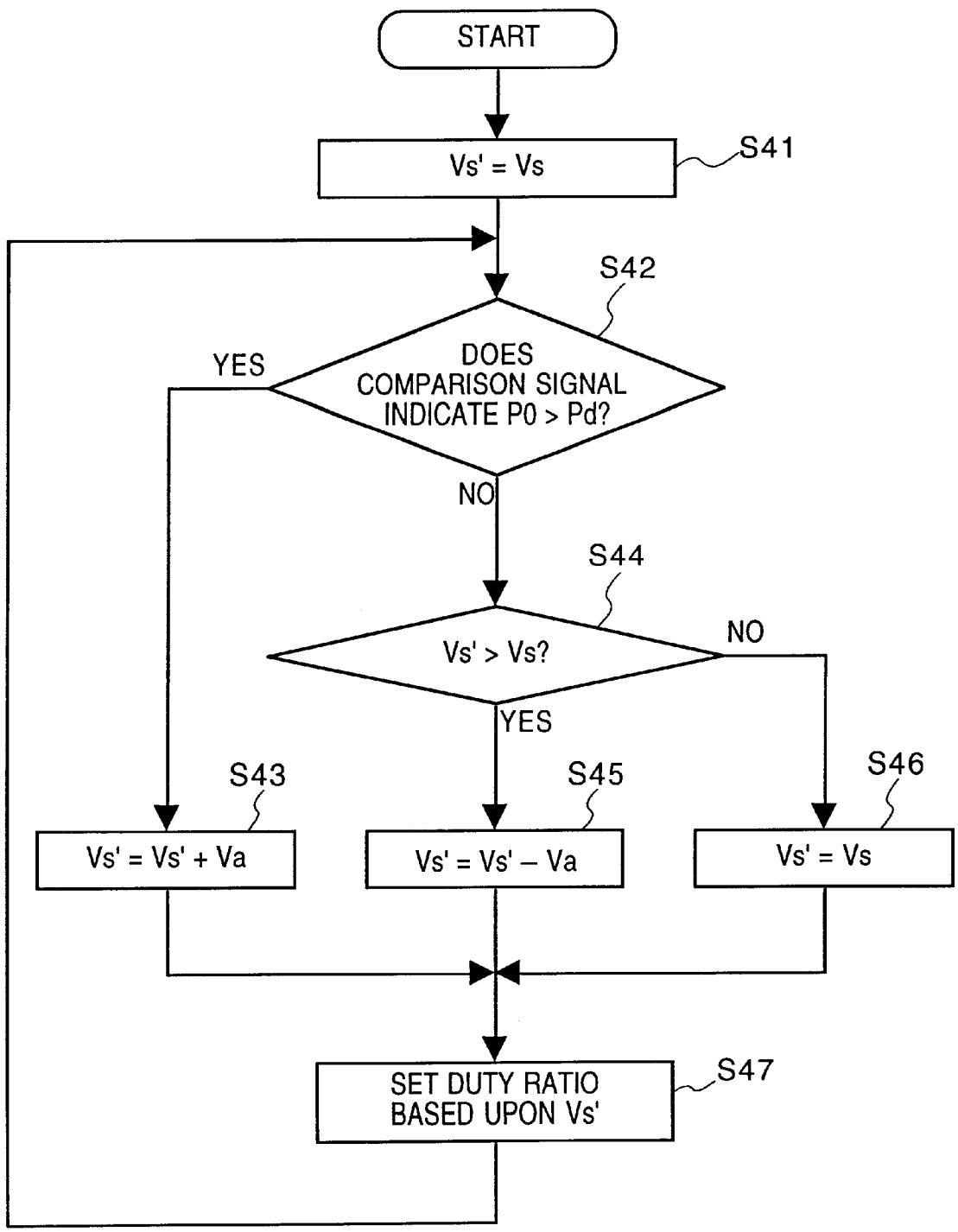
FIG. 7 is a flowchart illustrating the procedure of power control performed by a controller shown in FIG. 6.

FIG. 7 is a flowchart illustrating the procedure of power control performed by the controller 7 according to the third embodiment of the invention.

At step S41, the controller 7 sets the voltage setting value Vs to a voltage setting value Vs' that is for the purpose of adjusting the duty ratio of the gate pulses applied to the switching devices of the power conversion unit 2. The relationship between the output power Po of the power conversion unit 2 and the predetermined value Pd is decided based upon the aforementioned comparison signal at step S42. If the comparison signal indicates that Po≦Pd holds, then the flow proceeds to step S44, where Vs and Vs' are compared. If Vs'<Vs is found to hold at step S44, then the equality Vs'=Vs is established at step S46. This is followed by step S47, at which the duty ratio of the gate pulses applied to the switching devices of the power conversion unit 2 is adjusted in such a manner that the output voltage of the solar panel 1 attains the voltage setting value, after which the flow returns to step S42. In other words, in this case the usual MPPT control operation is carried out.

If the comparison signal indicates that Po>Pd holds, then a voltage correction value Va is added to the voltage setting value Vs' at step S43, and then the duty ratio is adjusted at step S47 in such a manner that the output voltage of the solar panel 1 becomes larger than the voltage setting value. The flow is then returned to step S42. If the comparison signal still indicates that Po>Pd holds, Va is added to the present Vs' again and power suppression control for adjusting the duty ratio at step S47 is repeated.

If the comparison signal is found to indicate Po≦Pd at step S42 after Vs' has been set to be larger than Vs, then Va is subtracted from Vs' at step S45 and the duty ratio is adjusted at step S47. The flow is then returned to step S42. In a case where the comparison signal still indicates that Po≦Pd holds, Va is subtracted from the present Vs' again at step S45 and the processing for adjusting the duty ratio at step S47 is repeated. If the decision rendered at step S44 is that Vs'≦Vs holds, then Vs'=Vs is established at step S46. In other words, the usual MPPT control operation is restored.

Thus, in a case where the AC output power Po of the power conversion unit 2 is greater than the predetermined value Pd, the controller 7 controls the switching operation of the power conversion unit 2 based upon the voltage setting value Vs' obtained by correcting the voltage setting value Vs that enters from the voltage setting unit 6. As a result, the operating-point voltage of the solar panel 1 rises, and the output power Po of the power control apparatus is suppressed. This makes it possible to protect the components of the power control apparatus, especially the components of the power conversion unit 2, from the heat produced by a excessive load.

As described above, each of the foregoing embodiments utilizes a characteristic wherein the output power of the solar panel declines when the output voltage of the solar panel surpasses the optimum operating voltage that corresponds to the maximum power Pmax. In other words, at the time of ordinary operation, MPPT control is executed by controlling the duty ratio of the gate pulses, which are applied to the switching devices of the power conversion unit, so as to obtain the output voltage of the solar panel set based upon the characteristic of the solar panel. If it is predicted that the output power of the power control apparatus will become too large in a case where, say, solar radiation intensifies to increase the power generated by the solar panel, the duty ratio of the gate pulses applied to the switching devices of the power conversion unit is controlled in such a manner that the output voltage of the solar panel will become the output voltage set based upon the output characteristic of the solar panel so as to lower the output power of the solar panel. This control of duty ratio controls the suppression of power. Of course, in a case where solar radiation weakens and the power generated by the solar panel declines, control to suppress power is terminated and MPPT control is restored.

In accordance with the foregoing embodiments, the following advantages are obtained:

(1) The output power of the power control apparatus can be prevented from becoming too large and the components constituting the power control apparatus can be protected against heat.

(2) In accordance with the first and second embodiments, control to suppress power can be achieved through a simple arrangement without adding on or modifying hardware.

(3) Control to suppress power can be applied to any solar system what so ever merely by setting various parameters such as the above-mentioned voltage setting value and power limit value in conformity with the characteristic of the solar panel and the specifications of the power conversion unit. This makes it possible to realize power suppression control, which has a high degree of universality, at low cost.

Thus the power control apparatus of the present invention is extremely useful and is highly effective when used in a solar power generation system tied to a commercial AC power system.

As many apparently widely different embodiments of the present invention can be made without departing from the spirit and scope thereof, it is to be understood that the invention is not limited to the specific embodiments thereof except as defined in the appended claims.

What is claimed is:

1. A power control apparatus for supplying a load with power output by a solar cell, comprising:
    converting means for converting output power of the solar cell to power conforming to the load;
    sensing means for sensing output voltage and output current of the solar cell;
    setting means for setting operating voltage of the solar cell based upon the output voltage and output current sensed; and
    control means for controlling operation of said converting means in such a manner that the output voltage of the solar cell becomes the set operating voltage;
    wherein said setting means raises the operating voltage by a predetermined amount of voltage in a case where the product of the output voltage and output current sensed is greater than a predetermined value.

2. The apparatus according to claim 1, wherein said setting means sets the operation voltage so as to obtain maximum output power from the solar cell in a case where the product of the output voltage and output current sensed is equal to or less than the predetermined value.

3. The apparatus according to claim 1, wherein said control means controls the output voltage of the solar cell by controlling ON/OFF duty of gate pulses applied to switching devices of said converting means.

4. A power control method for supplying a load with power output by a solar cell, comprising the steps of:
    sensing output voltage and output current of the solar cell;
    setting operating voltage of the solar cell based upon the output voltage and output current sensed; and
    controlling operation of a conversion unit, which converts output power of the solar cell to power conforming to the load, in such a manner that the output voltage of the solar cell becomes the set operating voltage,
    wherein the step of setting the operating voltage raises the operating voltage by a predetermined amount of voltage in a case where the product of the output voltage and output current sensed is greater than a predetermined value.

5. A power control apparatus for supplying a load with power output by a solar cell, comprising:
    converting means for converting output power of the solar cell to power conforming to the load;
    sensing means for sensing output voltage and output current of the solar cell;
    designating means for designating an operating condition of the solar cell based upon the output voltage and output current sensed; and
    control means for controlling operation of said converting means based upon a designation made by said designating means,
    wherein, in a case where the product of the output voltage and output current sensed is equal to or less than a predetermined value, said designating means designates the operating voltage of the solar cell and said control means controls operation of said converting means in such a manner that the output voltage of the solar cell attains the operating voltage that has been designated, and
    wherein in a case where the product of the output voltage and output current sensed exceeds the predetermined value, said designating means designates to raise the operating voltage of the solar cell and instructs said control means to suppress power.

6. The apparatus according to claim 5, wherein said designating means designates the operating voltage so as to obtain maximum output power from the solar cell in a case where the product of the output voltage and output current sensed is equal to or less than the predetermined value.

7. The apparatus according to claim 5, wherein said control means controls the output voltage of the solar cell by controlling ON/OFF duty of gate pulses applied to switching devices of said converting means.

8. The apparatus according to claim 5, wherein, in a case where the product of the output voltage and output current sensed becomes equal to or less than the predetermined value after suppression of power has been designated, said designating means designates instructs said control means to cancel suppression of power.

9. A power control method for supplying a load with power output by a solar cell, comprising the steps of:
    sensing output voltage and output current of the solar cell;
    designating an operating condition of the solar cell based upon the output voltage and output current sensed; and
    controlling operation of a conversion unit, which converts output power of the solar cell to power conforming to the load, based upon a designation made;
    wherein, in a case where the product of the output voltage and output current sensed is equal to or less than a predetermined value, said designating step designates the operating voltage of the solar cell and said control step controls operation of said conversion unit in such a manner that the output voltage of the solar cell attains the operating voltage that has been designated; and
    in a case where the product of the output voltage and output current sensed exceeds the predetermined value, said designating step designates to raise the operating voltage of the solar cell and designates suppression of power.

10. A power control apparatus for supplying a load with power output by a solar cell, comprising:

converting means for converting output power of the solar cell to power conforming to the load;

first sensing means for sensing output power of said converting means;

second sensing means for sensing output voltage and output current of the solar cell;

setting means for setting operating voltage of the solar cell based upon the sensed output voltage and output current of the solar cell; and control means for controlling the output voltage of the solar cell by controlling operation of said converting means based upon the set operating voltage and sensed output power of said converting means, wherein, in a case where the value of the sensed output power of said converting means is greater than a predetermined value, said control means controls the operation of said converting means based on a control voltage obtained by raising the operating voltage by a predetermined amount of voltage.

11. The apparatus according to claim 10, wherein said setting means sets the operating voltage, in such manner that maximum output power is obtained from the solar cell, based upon sensed output voltage and output current of the solar cell.

12. The apparatus according to claim 10, wherein, in a case where the value of the sensed output power of said converting means becomes equal to or less than the predetermined value after start of control based upon the control voltage, said control means controls the operation of said converting means based upon a lower ed control voltage.

13. The apparatus according to claim 10, wherein said control means control the output voltage of the solar cell by controlling ON/OFF duty of gate pulses applied to switching devices of said converting means.

14. A power control method for supplying a load with power output by a solar cell, comprising the steps of:

sensing output power of a conversion unit which converts output power of the solar cell to power conforming to a load;

sensing output voltage and output current of the solar cell;

setting operating voltage of the solar cell based upon the sensed output voltage and output current of the solar cell; and controlling the output voltage of the solar cell by controlling operation for said conversion unit based upon the set operating voltage and sensed output power of said conversion unit, wherein, in a case where the value of the sensed output power of the conversion unit is greater than a predetermined value, the operation of the conversion unit is controlled based on a control voltage obtained by raising the operating voltage by a predetermined amount of voltage.

* * * * *

UNITED STATES PATENT AND TRADEMARK OFFICE
CERTIFICATE OF CORRECTION

PATENT NO. : 5,923,158
DATED : July 13, 1999
INVENTOR(S) : SEIJI KUROKAMI ET AL.

It is certified that error appears in the above-identified patent and that said Letters Patent is hereby corrected as shown below:

SHEET 2

Figure 2:
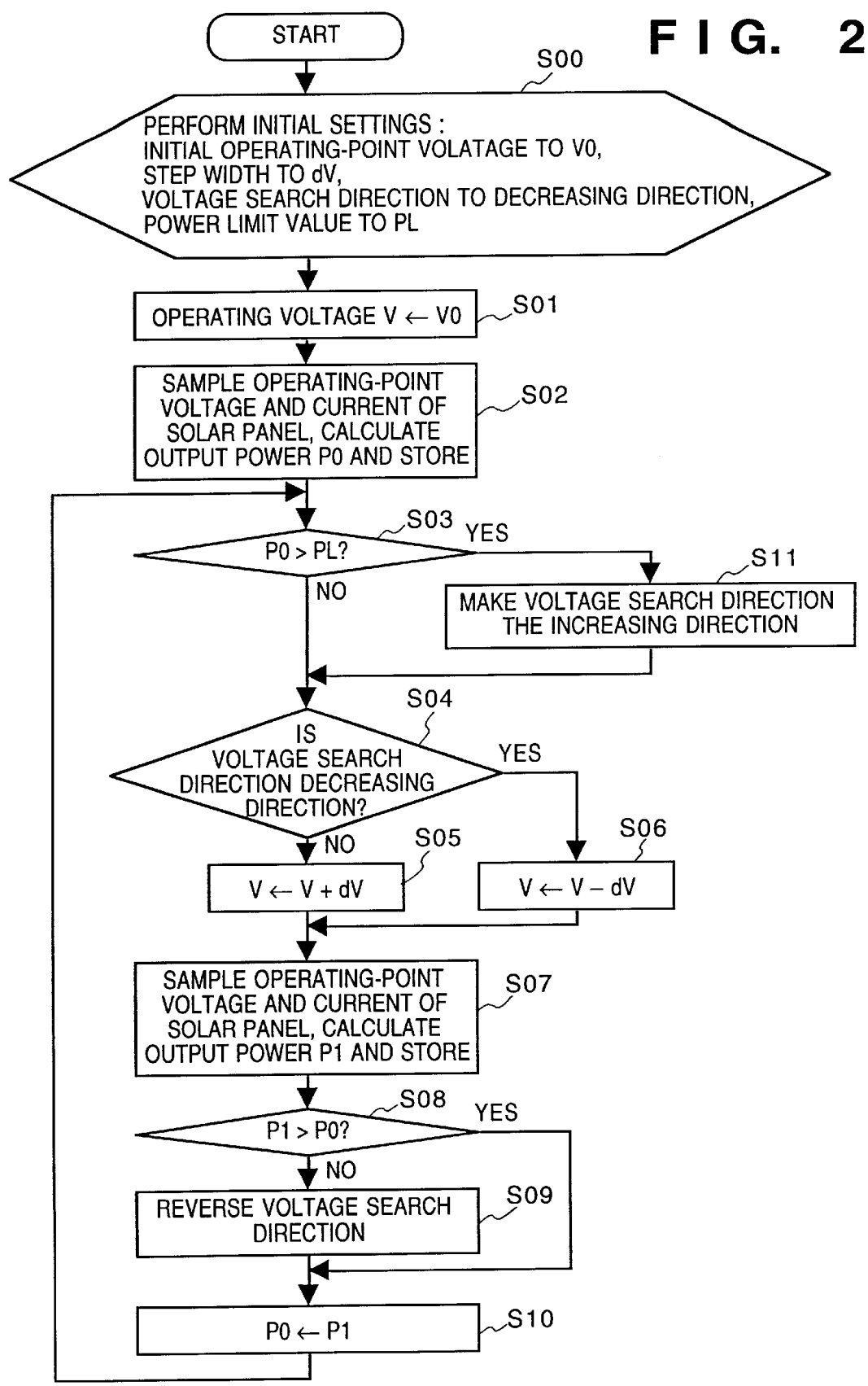
FIG. 2 is a flowchart useful in describing the details of a voltage setting method carried out by a voltage setting unit shown in FIG. 1.

FIGURE 2, "VOLATAGE" should read --VOLTAGE--.

SHEET 4

Figure 4:
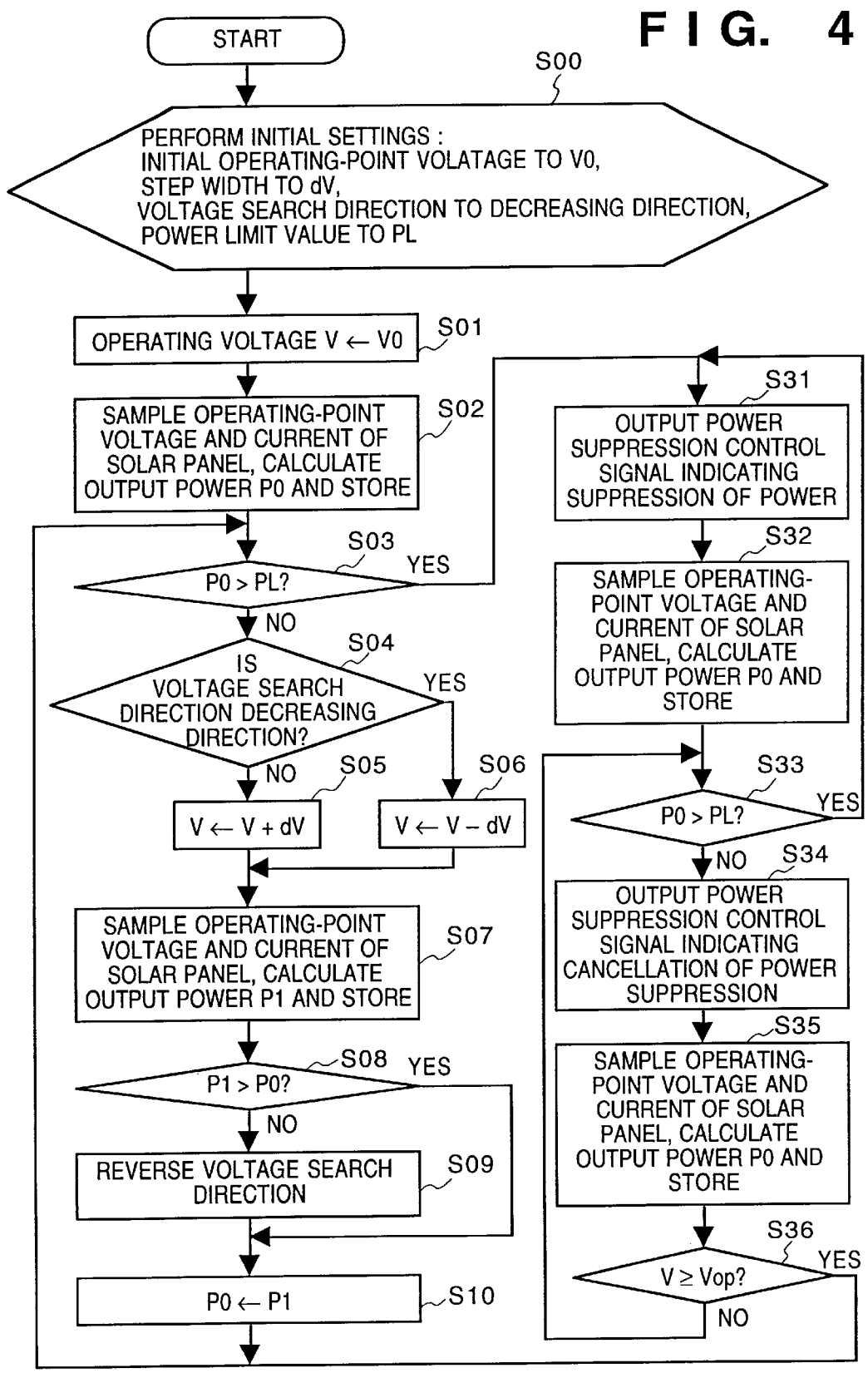
FIG. 4 is a flowchart useful in describing the details of a voltage setting method carried out by a voltage setting unit shown in FIG. 3.

FIGURE 4, "VOLATAGE" should read --VOLTAGE--.

COLUMN 1

Line 30, "value" should read --value,--.

COLUMN 3

Line 34, "self-exited" should read --self-excited--.

COLUMN 4

Line 22, "convention" should read --conversion--.

COLUMN 5

Line 26, "i.e." should read --i.e.,--;
    Line 32, "point PT" should read --point $P_T$--;
    Line 49, "raised" should read --raised,--; and
    Line 63, "suppressed" should read --suppressed,--.

UNITED STATES PATENT AND TRADEMARK OFFICE
CERTIFICATE OF CORRECTION

PATENT NO. : 5,923,158
DATED : July 13, 1999
INVENTOR(S) : SEIJI KUROKAMI ET AL.

It is certified that error appears in the above-identified patent and that said Letters Patent is hereby corrected as shown below:

COLUMN 6

Line 5, "No.6-348352" should read --No.6-348352,--.

COLUMN 8

Line 53, "a" should read --an--.

COLUMN 9

Line 19, "what so ever" should read --whatsoever--.

COLUMN 10

Line 27, "wherein" should read --wherein,--; and
    Line 45, "designates instructs" should read --instructs --.

COLUMN 11

Line 24, "manner" should read --a manner--.

UNITED STATES PATENT AND TRADEMARK OFFICE
CERTIFICATE OF CORRECTION

PATENT NO. : 5,923,158
DATED : July 13, 1999
INVENTOR(S) : SEIJI KUROKAMI ET AL.

It is certified that error appears in the above-identified patent and that said Letters Patent is hereby corrected as shown below:

<u>COLUMN 12</u>

Line 3, "lower ed" should read --lowered--; and
    Line 5, "control the" should read --controls the--.

Signed and Sealed this

Thirteenth Day of June, 2000

Attest:

Q. TODD DICKINSON

*Attesting Officer*    *Director of Patents and Trademarks*